United States Patent
Ng et al.

(10) Patent No.: US 8,453,134 B2
(45) Date of Patent: May 28, 2013

(54) IMPROVING DATA LOCALITY AND PARALLELISM BY CODE REPLICATION

(75) Inventors: John L. Ng, San Jose, CA (US); Alexander Y. Ostanevich, Moscow (RU); Alexander L. Sushentsov, Moscow (RU)

(73) Assignee: Intel Corporation, Santa Clara, CA (US)

( * ) Notice: Subject to any disclaimer, the term of this patent is extended or adjusted under 35 U.S.C. 154(b) by 1367 days.

(21) Appl. No.: 12/133,268

(22) Filed: Jun. 4, 2008

(65) Prior Publication Data

US 2009/0307674 A1    Dec. 10, 2009

(51) Int. Cl.
G06F 9/44      (2006.01)

(52) U.S. Cl.
USPC .......................................... 717/160; 717/161

(58) Field of Classification Search
USPC ......................................................... 717/160
See application file for complete search history.

(56) References Cited

U.S. PATENT DOCUMENTS

| | | | | |
|---|---|---|---|---|
| 6,038,398 | A * | 3/2000 | Schooler ........................ | 717/160 |
| 6,070,011 | A * | 5/2000 | Liu et al. ........................ | 717/160 |
| 6,772,415 | B1* | 8/2004 | Danckaert et al. ............. | 717/161 |
| 2002/0144244 | A1* | 10/2002 | Krishnaiyer et al. .......... | 717/140 |
| 2004/0034754 | A1* | 2/2004 | Schreiber ....................... | 711/165 |
| 2005/0246700 | A1* | 11/2005 | Archambault et al. ........ | 717/156 |
| 2006/0031652 | A1* | 2/2006 | Richter et al. ................. | 711/165 |
| 2006/0048120 | A1* | 3/2006 | Archambault et al. ........ | 717/160 |
| 2007/0050603 | A1* | 3/2007 | Vorbach et al. ................ | 712/221 |
| 2007/0079281 | A1* | 4/2007 | Liao et al. ...................... | 717/106 |
| 2009/0307673 | A1* | 12/2009 | Eichenberger et al. ........ | 717/160 |

OTHER PUBLICATIONS

Manjikian et al., Fusion of Loops for Parallelism and Locality, IEEE, 1997.*
Lim et al., Blocking and Array Contraction Across Arbitrarily Nested Loops Using Affine Partitioning, IEEE, 2001.*
Yi et al., Improving Memory Hierarchy Performance Through Combined Loop Interchange and Multi-Level Fusion, 2004.*
Fraboulet et al., Loop Fusion for Memory Space Optimization, 2001.*
Cooper, K.D. and L. Torczon, "Code Replication -for profit-", COMP 512, Rice University, Spring 2006, 23 pp.
Mueller, F. and D.B. Whalley, "Avoiding Conditional Branches by Code Replication", Proceedings of the ACM SIGPLAN 1995 Conference on Programming Language Design and Implementation, 1995, pp. 56-66.
Ng, J., D. Kulkarni, W. Li, R. Cox, and S. Bobholz, "Inter-Procedural Loop Fusion, Array Contraction and Rotation", Proceedings of the 12th International Conference on Parallel Architectures and Compilation Techniques, 2003, 11 pp.

* cited by examiner

*Primary Examiner* — Li B Zhen
*Assistant Examiner* — V Miller
(74) *Attorney, Agent, or Firm* — Barre Law Firm, PLLC

(57) ABSTRACT

Provided are a method, system, and article of manufacture improving data locality and parallelism by code replication and array contraction. Source code including an array of elements referenced using at least two indices is processed. The array is nested within multiple loops, wherein at least two of the loops perform iterations with respect to the indices of the array, wherein the index incremented in at least one innermost loop of the loops does not comprise a leftmost index in the array. The source code is transformed to object code by performing operations including fusing at least two innermost loops of the loops in object code generated by compiling the source code by replicating statements from at least one of the innermost loops into a fused innermost loop and performing loop interchange in the object code to have the fused innermost loop provide iterations with respect to the leftmost index in the array.

14 Claims, 6 Drawing Sheets

```
do k=1,n
 do i=1,n
  do j=js,je+1
   vfl  (j-2) = vx(i,j-2,k) + vy(i,j-2,k)

vt   (j-2) = ...
   bt   (j-2) = vfl  (j-1) = vx(i,j-1,k) + vy(i,j-1,k)

vt   (j-1) = ..
   bt   (j-1) = ...
   vfl  (j)   = vx(i,j,k)   + vy(i,j,k)

vt   (j)   = ...
   bt   (j)   = ...
   vfl  (j+1) = vx(i,j+1,k) + vy(i,j+1,k)
   vt   (j+1) = ...
   bt   (j+1) = ...
   dqm    = ( vt(j-1) - vt(j-2) )
   dqp    = ( vt(j)   - vt(j-1) )
   dv (j-1) = dqm + dqp
   dqm    = ( bt(j-1) - bt(j-2) )
   dqp    = ( bt(j)   - bt(j-1) )
   db (j-1) = dqm + dqp
   dqm    = ( vt(j  ) - vt(j-1) )
   dqp    = ( vt(j+1) - vt(j  ) )
   dv (j ) = dqm + dqp
   dqm    = ( bt(j  ) - bt(j-1) )
   dqp    = ( bt(j+1) - bt(j  ) )
   db (j ) = dqm + dqp
   vint(j)= ...
   emf(i,j,k) = vint(j) + vt(j)
   emg(i,j,k) = ...
  enddo
 enddo
enddo
```

FIG. 5

```
do k=1,n        64
  do i=1,n        62
    do  j=js,je+1
      vflj2     =  vx(i,j-2,k) +  vy(i,j-2,k)
      vtj2      = ...
      btj2      = ...
      vflj1     =  vx(i,j-1,k) +  vy(i,j-1,k)
      vtj1      = ...
      btj1      = ...
      vflj      =  vx(i,j,k) +  vy(i,j,k)
      vtj       = ...
      btj       = ...
      vfljp1    =  vx(i,j+1,k) +  vy(i,j+1,k)
      vtjp1 = ...
      btjp1 = ...
      dqm       = ( vtj1 - vtj2 )
      dqp       = ( vtj  - vtj1 )
      dvj1      =  dqm + dqp
      dqm       = ( btj1 - btj2 )
      dqp       = ( btj  - btj1 )
      dbj1      =  dqm + dqp
      dqm       = ( vtj  - vtj1 )
      dqp       = ( vtjp1 - vtj )
      dvj       =  dqm + dqp
      dqm       = ( btj  - btj1 )
      dqp       = ( btjp1 - btj )
      dbj       =  dqm + dqp
      vintj     = ...
      emf(i,j,k) = vintj  +  vtj
      emg(i,j,k) = ...
    enddo
  enddo
enddo
```

```
                                                        30'''
        do k=1,n
          do  j=js,je+1    66
           do i=1,n
            vflj2     =  vx(i,j-2,k) +  vy(i,j-2,k)
            vtj2      = ...
            btj2      = ...
            vflj1     =   vx(i,j-1,k) +  vy(i,j-1,k)
            vtj1      = ...
            btj1      = ...
            vflj      = vx(i,j,k) +  vy(i,j,k)
            vtj       = ...
            btj       = ...
            vfljp1    =  vx(i,j+1,k) +  vy(i,j+1,k)
            vtjp1     = ...
            btjp1     = ...
            dqm       = ( vtj1 - vtj2 )
            dqp       = ( vtj  - vtj1 )
            dvj1      =  dqm + dqp
            dqm       = ( btj1  - btj2 )
            dqp       = ( btj   - btj1 )
            dbj1      =  dqm + dqp
            dqm       = ( vtj  - vtj1 )
            dqp       = ( vtjp1 - vtj )
            dvj       =  dqm + dqp
            dqm       = ( btj  - btj1 )
            dqp       = ( btjp1 - btj )
            dbj       =  dqm + dqp
            vintj     = ...
      44─── emf(i,j,k) = vintj  + vtj
      46─── emg(i,j,k) = ...
           enddo
          enddo
        enddo
```

IMPROVING DATA LOCALITY AND PARALLELISM BY CODE REPLICATION

BACKGROUND

Source code written in a high level computer language is translated by a compiler into executable instructions. The source code may include a multi-dimensional array having one or more indices. A one-dimensional array corresponds to a vector, while a multi-dimensional array corresponds to a matrix. A one-dimensional array is a sequence of elements stored consecutively in memory. The type of an array element can be any of the basic data types, such as integer, logical, etc. Multi-dimensional arrays include elements whose location in the array is identified by two or more indices. For instance, a two dimensional array has two indices, a row index and column index and a one-dimensional array has only one index.

Processor speed has been increasing much faster than memory speed over the past several generations of processor families. As a result, the compiler must be very aggressive in memory optimizations in order to bridge the gap When subscripts are accessed in memory order, elements in the array are usually accessed in the order in which they are stored so memory accesses retrieve elements from memory in the order in which they are accessed in the code providing good memory locality with respect to the order in which the data is accessed. This situation of good memory locality is referred to as unit stride. The stride of an array refers to the number of locations in memory between successive array elements, measured in units of the size of the array elements. An array with stride one has elements that are contiguous in memory and are said to have unit stride, where array elements are sequentially accessed in the code in the order in which they are contiguously stored in memory.

In many cases, source code is written in a manner that results in poor memory locality when the array elements subscripts are not accessed in memory order, which is referred to as non-unit stride. The traditional methods of optimization by loop interchange and loop distributing cannot be applied. Memory dependencies may also prevent the outermost loop from being parallelized. In the current art, loop interchange is performed by loop distribution and loop fusion. Loop fusion is enabled by peeling off some loop iteration so the loops are conformable. Loop peeling creates loops which usually prevent loop interchange due to existence of non-perfect loop nests.

BRIEF DESCRIPTION OF THE DRAWINGS

FIGS. 4, 5, and 6 illustrate modifications of the source code according to the operations of FIG. 3.

DETAILED DESCRIPTION

Figure 1:
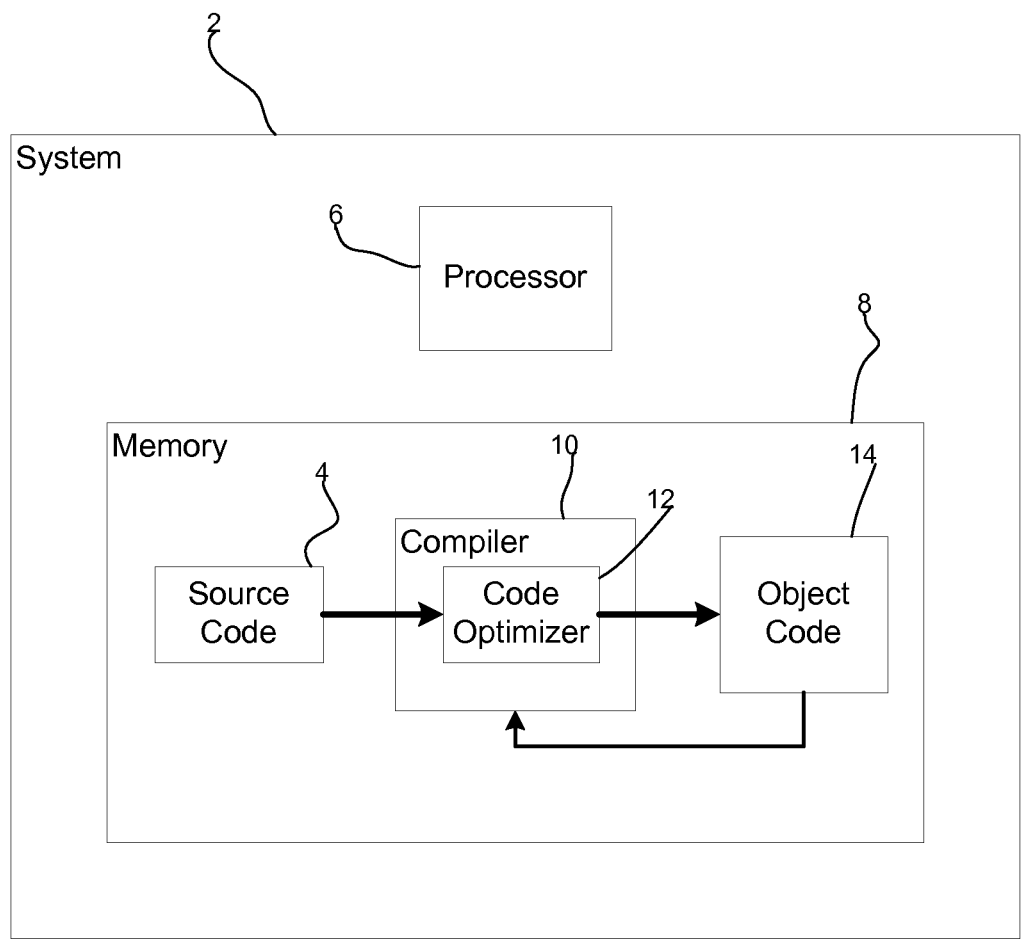
FIG. 1 illustrates a computing environment in accordance with the described embodiments.

FIG. 1 illustrates a computing environment. A system 2 is used by a programmer or software developer to create source code 4. In certain embodiments, the code 4 comprises program statements in a high level computer language, including object oriented and other languages, e.g., FORTRAN, Java, C++, etc. The system 2 includes one or more processors 6 and a memory 8 in which programs are loaded and executed by the processor 6. The memory 8 includes a compiler 10 to translate the source code 4 into executable object code 14. The compiler includes a code optimizer 12 program executed by the processor 6. The developer invokes the code optimizer 8 to optimize the positioning and placement of the instructions in the source code 4, including loops that perform iterations with respect to array indices, in the generated objected code 14 that is optimized with respect to multi-dimensional arrays. The object code 14 comprises binary executable code compiled from the source code 4. The code optimizer 8 may be included in the compiler 10 as shown in FIG. 1 or part of a separate module. The system 2 may comprise a computer workstation, laptop, desktop, server, mainframe or any other computing device suitable for developing code 4. FIG. 1 has arrows showing that the source code 4 is provided to the code optimizer 12 which generates optimized modified object code 14.

The processor 6 may comprise one or more central processing units and the memory 8 may comprise one or more memory devices into which programs are loaded and executed by the processor.

Figure 2:
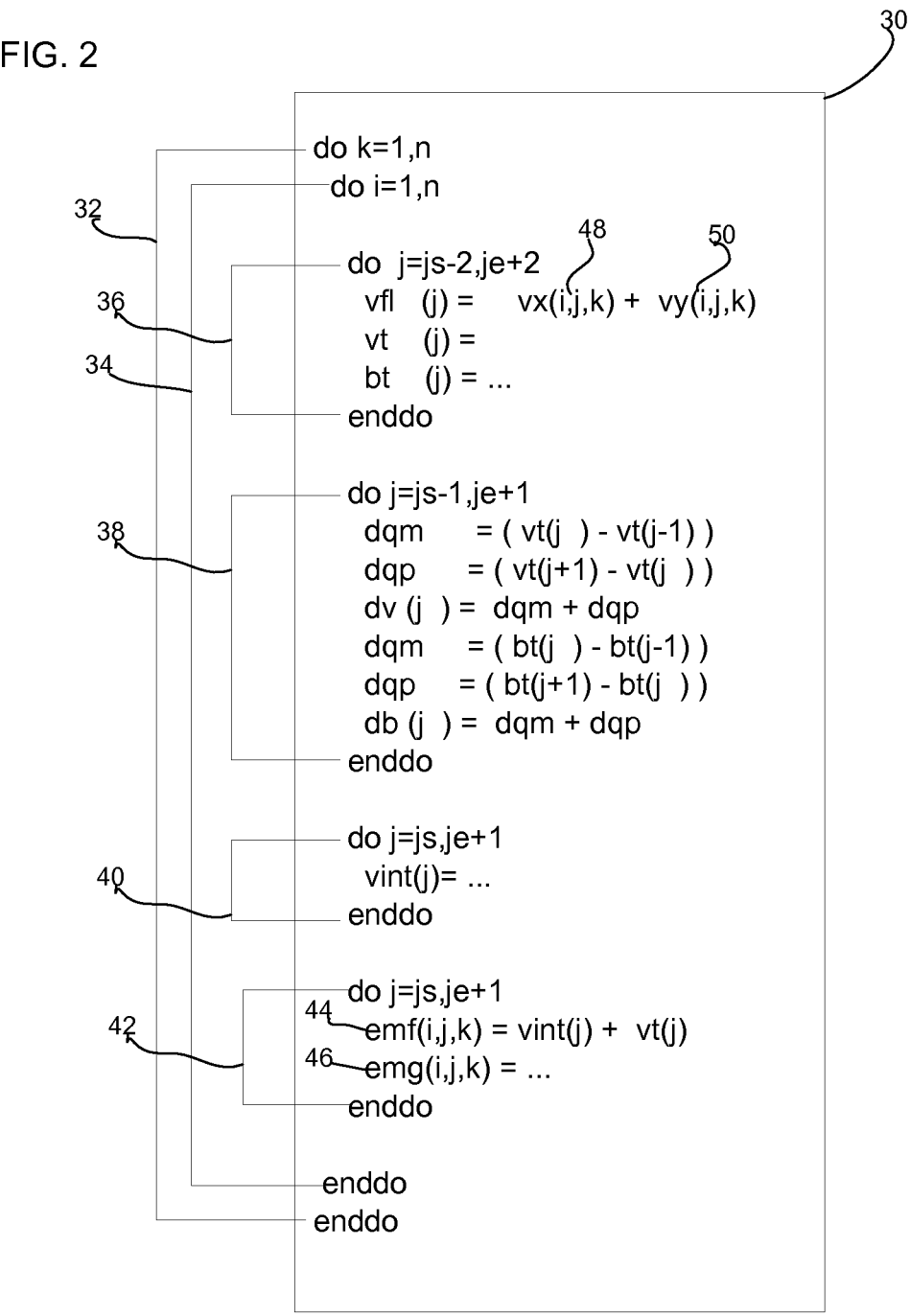
FIG. 2 illustrates an example of source code.

The code optimizer 12 seeks to rearrange the order of nested loop execution with respect to a multi-dimensional array data structure in the innermost nested loop in situations where in the original source code 4 the leftmost index of the multi-dimensional array is not the variable incremented in the innermost loop. FIG. 2 illustrates an example of a nested loop 30 within the source code 4 that includes loops 32, 34, 36, 38, 40 and 42 performing iterations with respect to the indices k, i, and j in array references emf(i, j, k) 44, emg(i, j, k) 46, vx (i,j,k) 48, and vy(i,j,k) 50. In the example of FIG. 2, there are four innermost j loops 36, 38, 40, and 42. The arrangement of the innermost j loops 36, 38, 40, and 42 within embracing k loop 32 and i loop 34 is inefficient with respect to memory accesses because inside the two innermost loops 36 and 42 (with index j) all the three dimensional arrays 44, 46, 48, and 50 are accessed with non-unit strides. In certain programming languages, such as FORTRAN, array elements are stored consecutively by column order. In such case, to access the elements of the arrays 44, 46, 48, and 50 sequentially called in the j loops 36 and 42, multiple lines of cache must be fetched from the memory to access the array elements 44, 46, 48, 50 sequentially, which does not access array elements consecutively by memory order.

The code optimizer 12 seeks to interchange the order of loop execution so that the leftmost index in the arrays, e.g., i index, is the variable incremented in the innermost loop, e.g., the i loop.

Figure 3:
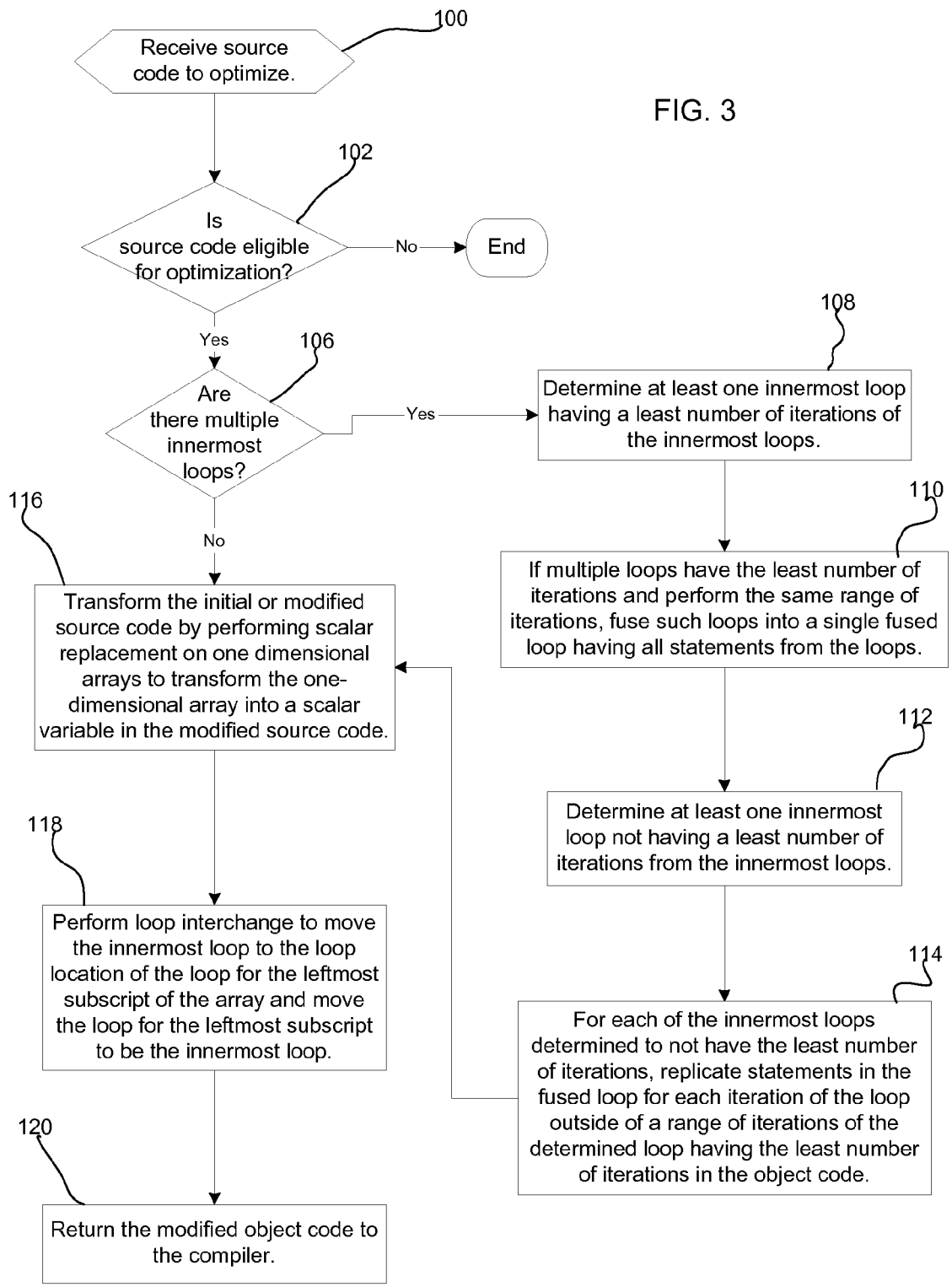
FIG. 3 illustrates an embodiment of operations to optimize source code including a multi-dimensional array.

FIG. 3 illustrates an embodiment of operations performed by the code optimizer 12 to interchange the order of nested innermost loops so that the leftmost index in multi-dimensional arrays in the innermost loop is the index incremented in the innermost loop. Upon receiving source code 4 to optimize (at block 100), such as a code including the nested loop 30 (FIG. 2), the code optimizer 12 determines (at block 102) whether the source code 4 is eligible for optimization. The source code 4 is eligible if the optimization operations performed by the code optimizer 12 improve the efficiency of the execution of the translated source code 4. In one embodiment, optimization is performed if the leftmost index in the multi-dimensional array in the innermost loop is not the variable incremented by the innermost loop. For instance, in FIG. 2 the innermost index i of the arrays 44, 46, 48, 50 is not incremented in the innermost loops 36 and 42, instead index j is incremented during iterations of the innermost loops.

If (at block 102) the source code 4 is not eligible for optimization, then control ends. Otherwise, if the source code 4 is eligible for optimization and if (at block 106) there are multiple innermost loops, e.g., innermost loops 36, 38, 40, 42 (FIG. 2), then the code optimizer 12 determines (at block 108) at least one innermost loop having a least number of iterations, e.g., loops 40 and 42. If multiple adjacent loops have the least number of iterations and perform the same range of iterations, then the code optimizer 12 fuses (at block 110) such loops into a single fused loop having all statements from the loops. The code optimizer 12 further determines (at block 112) at least one loop not having a least number of iterations, e.g., loops 36, 38. For each of the innermost loops determined as not having the same number of iterations as the loop having the least number of iterations, the code optimizer 12 replicates (at block 114) statements from such loops within the fused innermost loop being formed once and an additional time for each iteration of the loop outside of a range of iterations of the determined loop having the least number of iterations in modified source code. In this way, the statements in the innermost loops not having the least number of iterations are replicated in the fused innermost loop a number of times that is a difference of loop trip counts between the innermost loop for which the code is being replicated and the innermost loop having the least number of iterations. In certain embodiments, the innermost loops that are fused have loop trip counts which could differ by a constant value known at compile time. The optimizer 12 may consider trip count difference up to three or some other constant value. Further, if there were any innermost loops having the same number of iterations over a different range than the determined loop, then the code of such an innermost loop would be replicated into the fused innermost loop with variable statements such that when the determined loop having the least number of iterations is executed, the same results are outputted as would have been outputted by execution of the logic represented in the initial source code 4. The results of the fusion is that execution of the single fused innermost loop produces the same results as the logic represented in the original source code 4.

Figure 4:
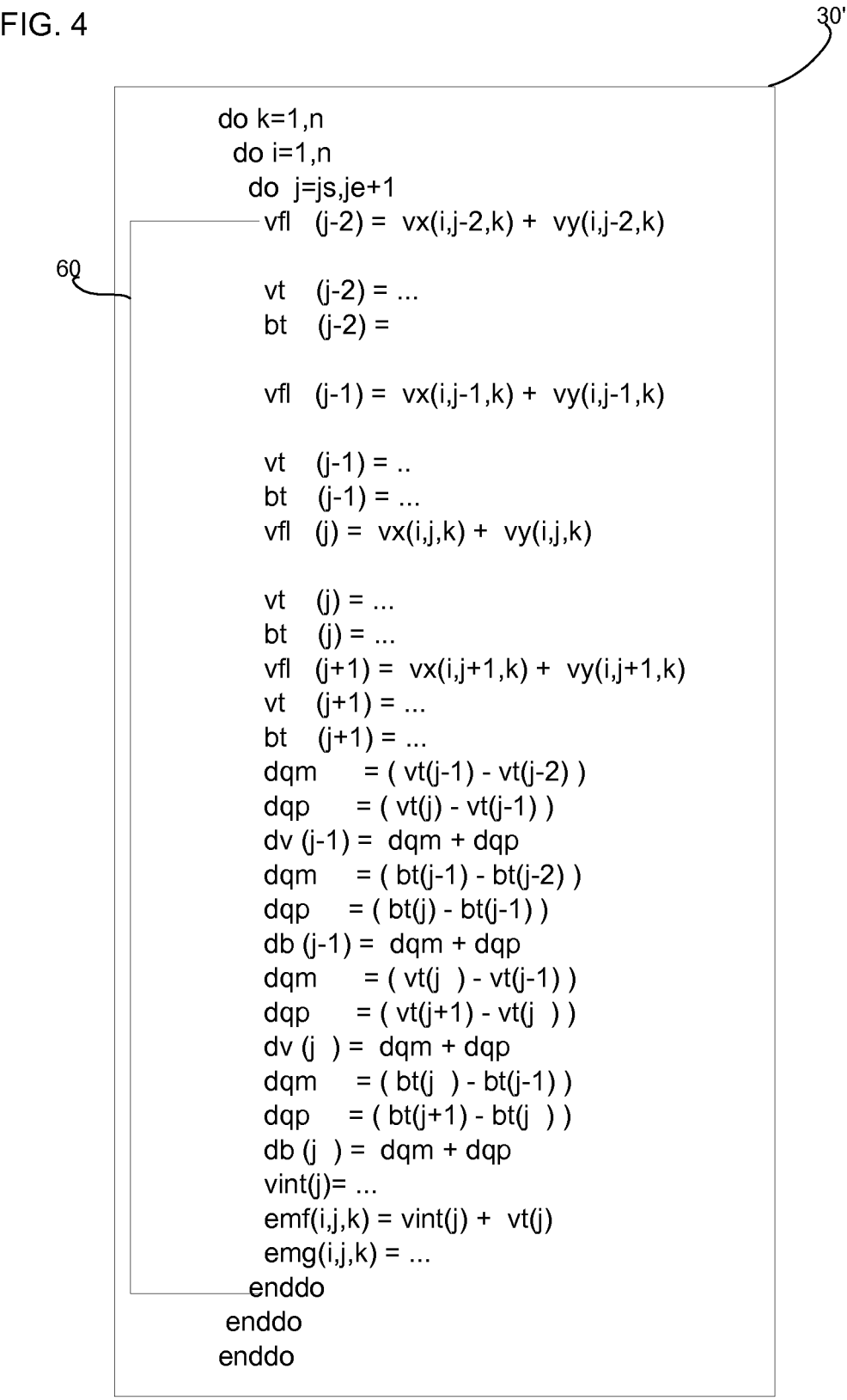

FIG. 4 illustrates an example of the modified loop 30' resulting from the fusing operations performed on the initial loop 30 with the innermost loops 36, 38, 40, and 42 of the initial loop 30 merged into a single fused loop 60. The loop 36 was code replicated three times for those iterations of the range js−2 to je+2 that are beyond the range of the loop 40 and 42 having the least number of iterations over range j=js, je+1. Particularly js−2, js−1 and je+2 iterations were replicated to fit the loop 36 to the js,je+1 range. The loop 38 was code replicated once for the iteration js−1. The code replicated statements include variables to reproduce the original statements when generated in the fused loop 50.

After fusing the innermost loops, e.g., 36, 38, 40, 42 (from block 114) or if there is only one innermost loop (from the no branch of block 106), the code optimizer 12 transforms (at block 116) the logic in the initial source code 14 by performing array contraction on one dimensional arrays in the innermost loop to transform the one dimensional arrays into scalar variables in the object code 14. The resulting scalar variables may be stored in registers. The scalar replacement may involve checking for arrays that are not live outside the loop. FIG. 5 illustrates an example of scalar replacement where the modified source code 30'' has scalar variables, such as vflj2, vtj2, btj2, vflj1,ftj1, btj1, etc., that comprise scalar values of the one-dimensional arrays vfl(j), vt(j), bt(j) in the initial source code 30 (FIG. 2).

Following scalar replacement, the code optimizer 12 performs (at block 118) loop interchange to interchange or switch the innermost loop and the loop for the leftmost subscript of the multi-dimensional arrays so that the loop iterating for the leftmost subscript is a single innermost loop, which may result from loop fusion and code replication. With respect to FIG. 5, loop interchange would switch j loop 62 and i loop 64. FIG. 6 illustrates an example of code 30''' resulting from the loop interchange, where now i loop 66 is the innermost loop, such that the innermost i loop performs iterations with respect to the leftmost i index of the multi-dimensional arrays 44, 46, 48, 50.

Described embodiments provide techniques to interchange loops so that an innermost loop performs iterations with respect to a leftmost index of a multi-dimensional array so that when the innermost loop runs, the array elements generated in the loop are stored consecutively or adjacent in memory. In described embodiments, the original source code contains loop nests and array subscript references that are in poor memory locality. Further, data dependency may prevent parallelization on outer loops. The transformation performed by the compiler uses code replication to enable loop fusion and loop interchange and then enable parallelization on outer loops by contracting array references that inhibit data dependency. The final object code generated has a single innermost loop.

ADDITIONAL EMBODIMENT DETAILS

The described operations may be implemented as a method, apparatus or article of manufacture using standard programming and/or engineering techniques to produce software, firmware, hardware, or any combination thereof. The described operations may be implemented as code maintained in a "computer readable storage medium", where a processor may read and execute the code from the computer storage readable medium. A computer readable storage medium may comprise storage media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The "article of manufacture" may comprise a transmitting station and/or a receiving station for transmitting and receiving transmission signals in which the code or logic is encoded, where the code or logic encoded in the transmission signal may be decoded and stored in hardware or a computer readable storage medium at the receiving and transmitting stations or devices. An "article of manufacture" comprises a computer readable storage medium, hardware device, and/or transmission transmitters or receivers in which code or logic may be implemented. Those skilled in the art will recognize that many modifications may be made to this configuration without departing from the scope of the present invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIG. 3 certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method to optimize object code, comprising:
processing source code including an array of elements referenced using at least two indices, wherein the array is nested within multiple loops, wherein at least two of the loops perform iterations with respect to the indices of the array, wherein the loops comprise multiple innermost loops, and wherein the index incremented in at least one of the innermost loops does not comprise a leftmost index in the array;
transforming the source code to object code by performing operations, including:
identifying a least loop among the innermost loops, wherein the least loop has a least number of iterations of the innermost loops;
identifying a not-least loop among the innermost loops, wherein the not-least loop has more iterations than the least loop;
determining a loop iteration difference denoting how many more iterations the not-least loop has, relative to the least loop;
performing code replication for the not-least loop, wherein the operation of performing code replication comprises:
replacing the not-least loop with a replacement loop, wherein the replacement loop has the least number of iterations, and the replacement loop comprises:
an original copy of statements from the not-least loop; and N modified copies of the statements from the not-least loop, where N equals the loop iteration difference;
fusing the least loop and the replacement loop into a fused innermost loop; and
performing loop interchange to have the fused innermost loop provide iterations with respect to the leftmost index in the array;
parallelizing an outer loop in the object code following the loop interchange without data dependency, wherein the source code includes at least one statement including at least one one-dimensional array within at least one of the innermost loops that prevents parallelization on the outer loop; and
transforming the source code by performing array contraction to transform the one dimensional array that inhibits parallelization to a scalar variable.

2. The method of claim 1, wherein the loops represented in the source code are coded to access elements of the array in memory at non-contiguous locations in the memory and wherein following the loop interchange in the object code, the elements of the array are accessed contiguously in memory, wherein the innermost loops in the source code include multiple arrays having indices, wherein the leftmost index of the arrays are not incremented in the innermost loops of the source code.

3. The method of claim 1, wherein at least two of the innermost loops fused have a constant trip count difference known at compile time.

4. The method of claim 1, wherein the array contraction is performed before performing the loop interchange.

5. The method of claim 1, wherein the least loop and the replacement loop are fused into the fused innermost loop before performing the loop interchange.

6. A system to optimize object code that accesses data in an array from a memory device, comprising:
a processor; and a computer readable storage media including a program executed by the processor to perform operations, the operations comprising:

processing source code including an array of elements referenced using at least two indices, wherein the array is nested within multiple loops, wherein at least two of the loops perform iterations with respect to the indices of the array, wherein the loops comprise multiple innermost loops, and wherein the index incremented in at least one of the innermost loops does not comprise a leftmost index in the array;

transforming the source code to object code by performing operations, including:

identifying a least loop among the innermost loops, wherein the least loop has a least number of iterations of the innermost loops;

identifying a not-least loop among the innermost loops, wherein the not-least loop has more iterations than the least loop;

determining a loop iteration difference denoting how many more iterations the not-least loop has, relative to the least loop;

performing code replication for the not-least loop, wherein the operation of performing code replication comprises:

replacing the not-least loop with a replacement loop, wherein the replacement loop has the least number of iterations, and the replacement loop comprises:

an original copy of statements from the not-least loop; and N modified copies of the statements from the not-least loop, where N equals the loop iteration difference;

fusing the least loop and the replacement loop into a fused innermost loop; and performing loop interchange to have the fused innermost loop provide iterations with respect to the leftmost index in the array;

parallelizing an outer loop in the object code following the loop interchange without data dependency, wherein the source code includes at least one statement including at least one one-dimensional array within at least one of the innermost loops that prevents parallelization on the outer loop; and transforming the source code by performing array contraction to transform the one dimensional array that inhibits parallelization to a scalar variable.

7. The system of claim 6, wherein the loops represented in the source code are coded to access elements of the array in the memory device at non-contiguous locations in the memory and wherein following the loop interchange in the object code, the elements of the array are accessed contiguously in the memory device, wherein the innermost loops in the source code include multiple arrays having indices, wherein the leftmost index of the arrays are not incremented in the innermost loops of the source code.

8. The system of claim 6, wherein the least loop and the replacement loop are fused into the fused innermost loop before performing the loop interchange.

9. An article of manufacture comprising:

at least one non-transitory computer readable storage medium; and code in the at least one non-transitory computer readable storage medium, wherein the code, when executed by a processing system, enables to processing system to perform operations comprising:

processing source code including an array of elements referenced using at least two indices, wherein the array is nested within multiple loops, wherein at least two of the loops perform iterations with respect to the indices of the array, wherein the loops comprise multiple innermost loops, and wherein the index incremented in at least one of the innermost loops does not comprise a leftmost index in the array;

transforming the source code to object code by performing operations, including:

identifying a least loop among the innermost loops, wherein the least loop has a least number of iterations of the innermost loops;

identifying a not-least loop among the innermost loops, wherein the not-least loop has more iterations than the least loop;

determining a loop iteration difference denoting how many more iterations the not-least loop has, relative to the least loop;

performing code replication for the not-least loop, wherein the operation of performing code replication comprises:

replacing the not-least loop with a replacement loop, wherein the replacement loop has the least number of iterations, and the replacement loop comprises:

an original copy of statements from the not-least loop; and N modified copies of the statements from the not-least loop, where N equals the loop iteration difference;

fusing the least loop and the replacement loop into a fused innermost loop; and performing loop interchange to have the fused innermost loop provide iterations with respect to the leftmost index in the array;

parallelizing an outer loop in the object code following the loop interchange without data dependency, wherein the source code includes at least one statement including at least one one-dimensional array within at least one of the innermost loops that prevents parallelization on the outer loop; and transforming the source code by performing array contraction to transform the one dimensional array that inhibits parallelization to a scalar variable.

10. The article of manufacture of claim 9, wherein the loops represented in the source code are coded to access elements of the array in memory at non-contiguous locations in the memory and wherein following the loop interchange in the object code, the elements of the array are accessed contiguously in memory, wherein the innermost loops in the source code include multiple arrays having indices, wherein the leftmost index of the arrays are not incremented in the innermost loops of the source code.

11. The article of manufacture of claim 9, wherein the least loop and the replacement loop are fused into the fused innermost loop before performing the loop interchange.

12. The article of manufacture of claim 9, wherein the operation of fusing the least loop and the replacement loop into a fused innermost loop comprises:

fusing all of the innermost loops into the fused innermost loop.

13. The method of claim 1, wherein the operation of fusing the least loop and the replacement loop into a fused innermost loop comprises:

fusing all of the innermost loops into the fused innermost loop.

14. The system of claim 6, wherein the operation of fusing the least loop and the replacement loop into a fused innermost loop comprises:

fusing all of the innermost loops into the fused innermost loop.

* * * * *